United States Patent [19]
Saiki

[11] Patent Number: 6,070,896
[45] Date of Patent: Jun. 6, 2000

[54] SEAT FIXING STRUCTURE OF MOTORCYCLE

[75] Inventor: Terunari Saiki, Saitama, Japan

[73] Assignee: Honda Giken Kogyo Kabushiki Kaisha, Tokyo, Japan

[21] Appl. No.: 09/039,447

[22] Filed: Mar. 16, 1998

[30] Foreign Application Priority Data

Apr. 2, 1997 [JP] Japan ................................ 9-084142

[51] Int. Cl.[7] ............................... B62J 1/08; B60N 2/38
[52] U.S. Cl. ................................ 280/288.4; 297/195.1; 297/243
[58] Field of Search ...................... 280/288.4; 180/219; 297/243, 195.1, 195.13; 248/300

[56] References Cited

U.S. PATENT DOCUMENTS

| | | | |
|---|---|---|---|
| 1,813,672 | 7/1931 | Mesinger | 297/243 |
| 3,658,380 | 4/1972 | Townsend | 297/211 |
| 3,970,345 | 7/1976 | Holcomb | 297/215.11 |
| 4,125,285 | 11/1978 | Hanagan | 297/195 |
| 4,452,330 | 6/1984 | Matsuyama | 180/219 |
| 4,577,719 | 3/1986 | Nomura et al. | 180/219 |
| 5,174,539 | 12/1992 | Leonard | 248/558 |

FOREIGN PATENT DOCUMENTS 6-32269  2/1994  Japan .................................. 180/219

*Primary Examiner*—J. J. Swann
*Assistant Examiner*—David R. Dunn
*Attorney, Agent, or Firm*—Birch, Stewart, Kolasch & Birch, LLP

[57] ABSTRACT

A main seat of a motorcycle has a rear section with an improved outer appearance, and an increased supporting strength. The main seat is supported at the rear side frame through a fixing member fixed at a rising section at its rear. The seat fixing structure is constructed such that the fixing member is integrally provided with an ornamental plate section extending along the outer circumferential edge at the rear surface of the rising section. As a result, the seat fixing member improves the visual appearance of the rear section of the seat, and improves the supporting strength of the seat.

24 Claims, 3 Drawing Sheets

SEAT FIXING STRUCTURE OF MOTORCYCLE

BACKGROUND OF THE INVENTION

1. Field of the Invention

This invention relates to a seat fixing structure of a motorcycle, and more particularly, to a seat fixing member for improving the visual appearance of the rear section of the seat, and for improving the supporting strength of the seat.

2. Description of the Background Art

In the prior art seats for motorcycles, it is generally known that the circumferential end section of a surface material covering a main body of the seat is wound onto the rear of the main body of the seat, and staples are driven into the seat to fix the surface material to the main body of the seat.

Further, some American style motorcycles have a two-piece seat that is separated into a main seat and a rear seat, with the rear seat being removably attached to the motorcycle. In this type of motorcycle, when the rear seat is removed, the rear section of the main seat is exposed, making it necessary to arrange an attitude of the rear section of the main seat and assure its outer appearance characteristic.

In view of the foregoing, the rear surface of the main seat is constructed to be parallel with a direction of view from the rear side so as to prevent either the end section of the surface material wound onto the rear side of the main seat to show its wrinkled state, or to prevent the staples from being easily seen. At the same time, a plate thickness of the fixing member for use in fixing the rear section of the main seat to the frame is faced toward the direction of view to prevent the fixing structure for the main seat from being seen. Further, the size of the fixing member is made as small as possible so as to prevent the fixing structure for the main seat from being easily seen so that the outer appearance of the rear section of the main seat can be assured.

However, in a case where the rear section of the main seat is formed with a rising section extending in a rearwardly and upwardly slanting direction to receive the waist of a driver or the like, the rear surface structures of the main seat are visible. For example, end sections of the surface material wound onto the rear side of the rising section, wrinkled surface material, or staples driven into the end section of the surface material are seen from the rear side of a vehicle when the rear seat is removed. The result is that the outer appearance is nor visually desirable.

In addition, in the prior art system, the fixing member was constructed to be small in size in order to be less noticeable in order to assure its outer appearance characteristic. Accordingly, there was a problem that the supporting strength at both side sections of the rear section of the main seat was lacking.

SUMMARY OF THE INVENTION

It is an object of the present invention to improve an outer appearance characteristic of the rear section of the seat for a motorcycle, and to improve the supporting strength for the seat.

In order to accomplish the aforesaid object, the present invention provides a seat fixing structure for a motorcycle in which a rising section extending in a rearwardly and upwardly slanting direction is formed at a rear section of a seat. A rear surface of the rising section is inclined in a rearward and upward direction. A fixing member for supporting the seat on a frame of the motorcycle is integrally provided with an ornamental plate section extending along an outer circumferential edge section of the rear surface of the aforesaid rising section.

In accordance with the present invention, the seat rear surface structures which are present at the outer circumferential edge section of the rear surface of the rising section are covered by the ornamental plate section for the fixing member. For example, seat surface material wound onto the rear surface of the seat to be wrinkled, or staples for use in fixing the end part of the seat surface material or the like, are covered by the ornamental plate section for the fixing member, resulting in that an outer appearance characteristic of the rear surface of the rising section is improved.

In addition, if an ornamental plate section is provided, it is possible to improve the supporting strength of the rear section of the seat by making the fixing member large in size without deteriorating from an outer appearance characteristic of the rear section of the seat. Further, if the ornamental plate section is extended over an entire length of the outer circumferential edge part of the rear surface of the rising section to fix its both ends to the seat, it becomes possible to make a wide supporting span in a width direction of the seat in respect to the fixing member, thereby improving the stability of the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF THE PREFERRED EMBODIMENT

Figure 1:
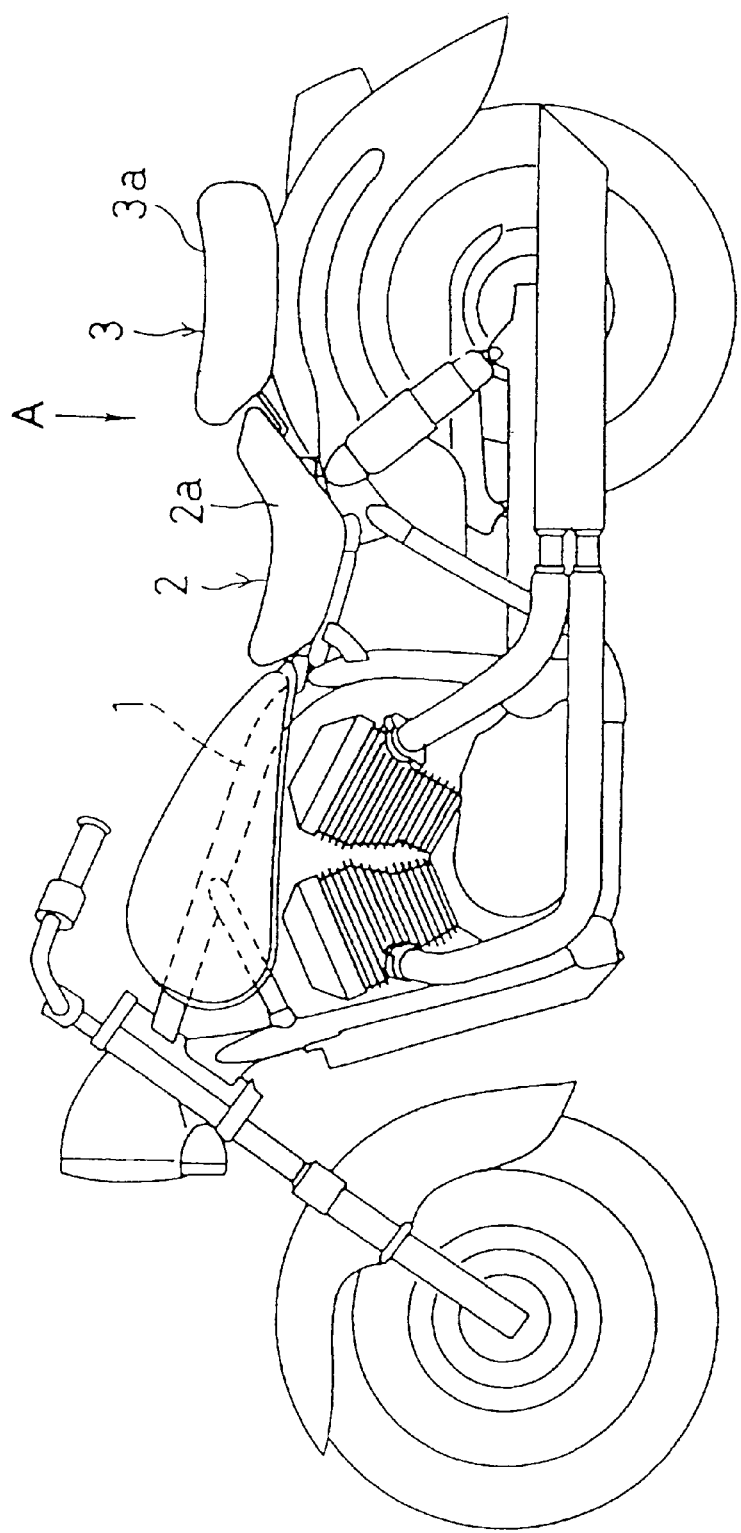
FIG. 1 is a side elevational view showing a motorcycle to which the seat fixing structure of the present invention is applied.
Figure 4:
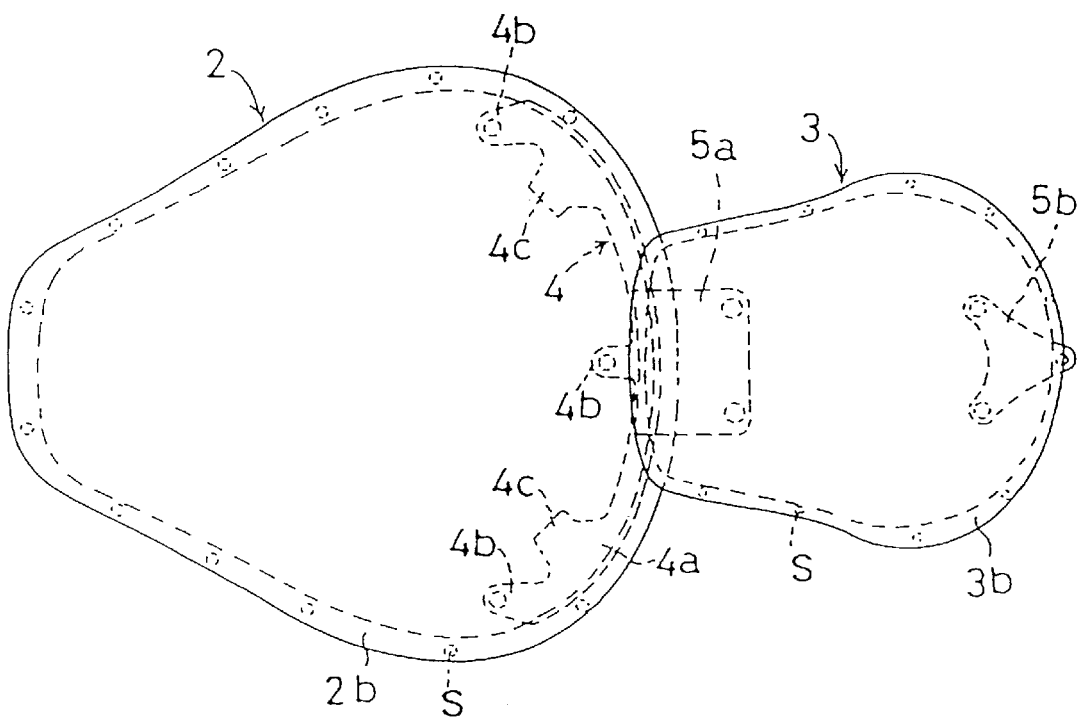
FIG. 4 is a top plan view showing an arrangement of the seat as viewed from a direction of arrow A in FIG. 1.

Referring now to FIG. 1, reference numeral 1 denotes a frame of an American style motorcycle. A main seat 2 is positioned substantially at a central section of the motorcycle in a longitudinal direction and mounted on the frame 1. A rear seat 3 is fixed at a rear part of the main seat 2 in cooperation with the main seat 2. Cover materials 2a, 3a of each of the seats 2, 3 are wound at the rear side of the seats 2, 3 and fixed to the seats 2, 3 by staples S driven into outer circumferential edges 2b, 3b (refer to FIG. 4) at the rear surfaces of the seats 2, 3.

Figure 2:
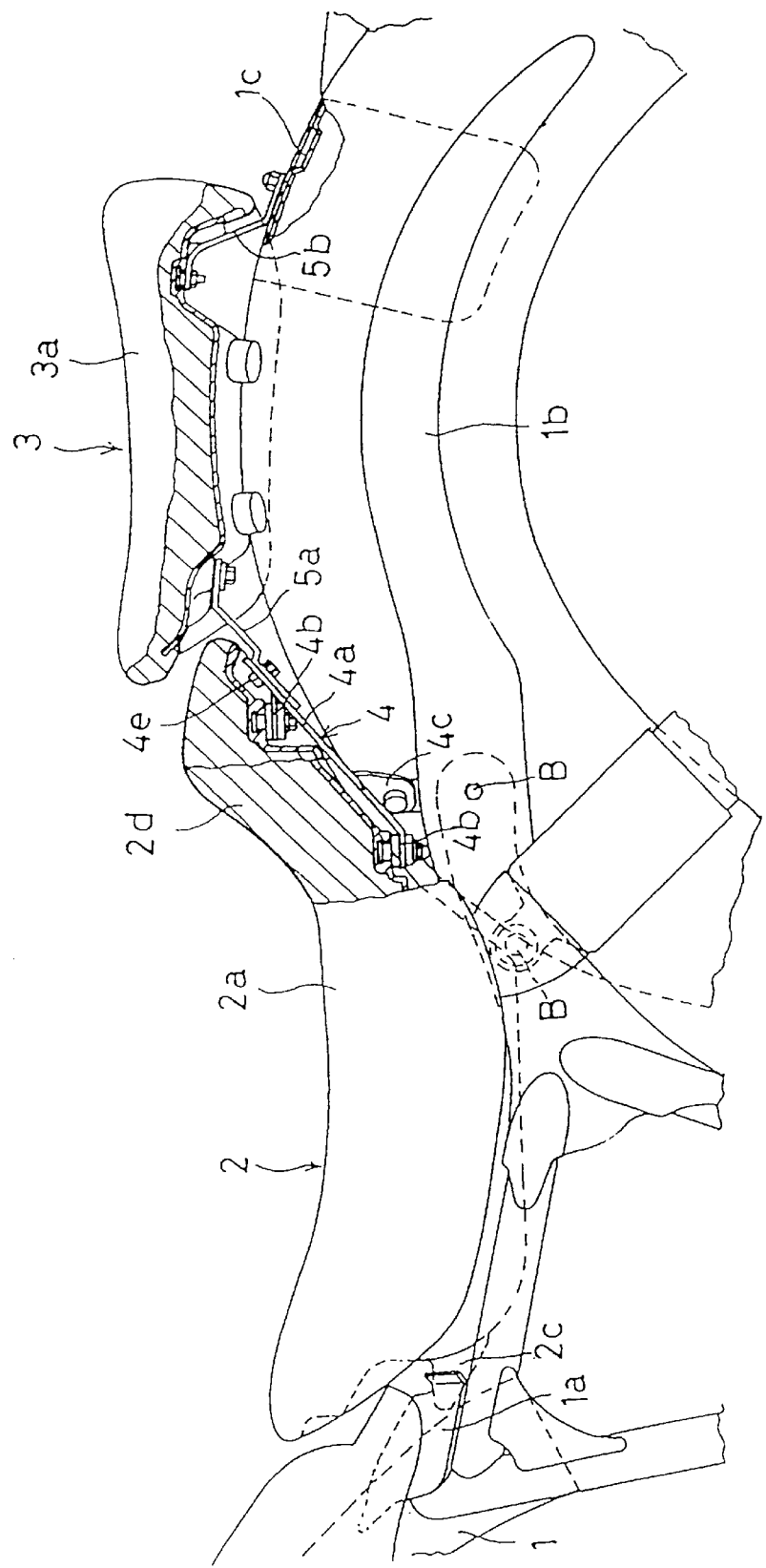
FIG. 2 is a side elevational view in partial section showing the seat fixing structure.
Figure 3:
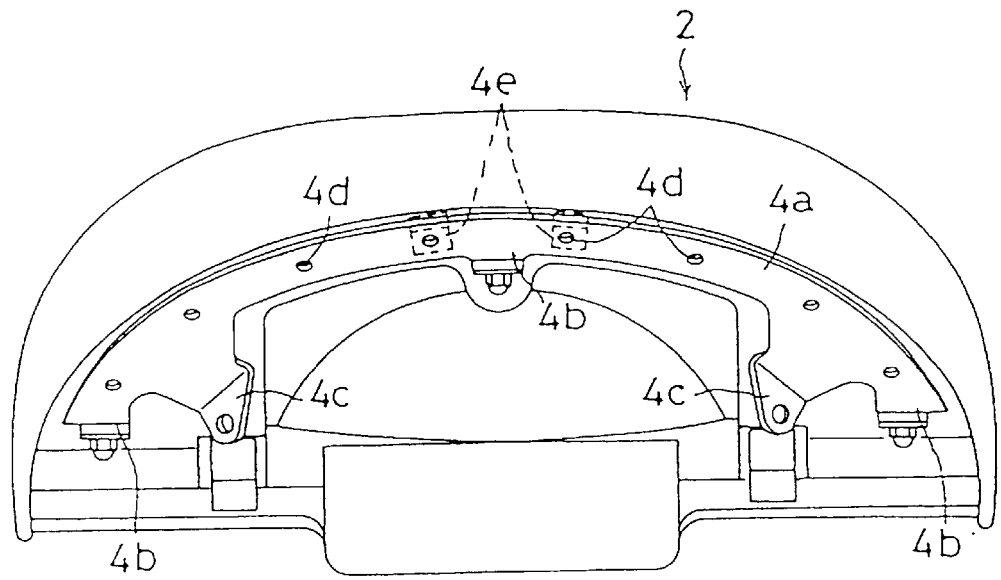
FIG. 3 is a rear view of the main seat.

Referring to FIG. 2, an engaging member 1a having an opening opened toward a rearward direction of the frame 1 is fixed to a position where the front section of the main seat is arranged. The main seat 2 is provided, at its front end, with an engaging piece 2c projected forwardly. The engaging piece 2c is engaged with the engaging member 1a, and the rear part of the seat is fixed to a rear side frame 1b fastened to the frame 1 by bolts B through a fixing member 4. In this way, the main seat 2 is fixed to the motorcycle.

The rear seat 3 is fixed to the motorcycle by a front side bracket 5a which fastens the front section of the rear seat 3 to the fixing member 4. A rear side bracket 5b fastens the rear section of the rear seat 3 to a bridge-like supporting section 1c fixed to the rear side frame 1b. In this way, the rear seat 3 can be fixed to or removed from the motorcycle by removing both brackets 5a, 5b from the fixing member 4 and the supporting section 1c.

The main seat 2 is provided, at its rear section, with a rising section 2d extending in a slant in a rearward and upward direction. The rear surface of the rising section 2d is also inclined in a rearward and upward direction. Accordingly, viewing the motorcycle from its rear section while the rear seat 3 is being removed causes the rear surface of the rising section 2d to be visible In view of the foregoing, the preferred embodiment of the present invention includes a fixing member 4 for supporting the rear section of the main seat 4 which comprises a member having an ornamental plate section 4a arranged in a substantially arcuate form along the outer circumferential edge section 2b at the rear surface of the rising section 2d. The outer circumferential edge section 2b at the rear surface of the rising section 2d of the main seat 2 is covered by the ornamental plate section 4a. The ornamental plate section 4a is spaced apart by a predetermined distance from the rear surface of the rising section and arranged in a substantially parallel relation. The fixing member 4 is fixed by screws to the rear surface of the rising section 2d of the main seat 2 through tongue pieces (lugs) 4b projected at the central part of the ornamental plate section 4a, and in forward horizontal directions from both ends of the ornamental plate section 4a. In addition, the fixing member 4 is fastened to the rear side frame 1b by bolts through a pair of right and left fastening pieces (lugs) 4c formed at the ornamental plate section 4a so as to be extended in a downward vertical direction. Additionally, welding nuts 4e are fixed to the rear surfaces of the central two opening holes 4d of the opening holes 4d formed in a specified interval in a longitudinal direction of the ornamental plate section 4a so as to fasten and connect the aforesaid front side bracket 5a.

With such an arrangement as above, either the wrinkled part of the surface cover material 2a wound onto the rear surface of the main seat 2 or the structure of the rear surface of each of the outer circumferential edge sections 2b of the staples S or the like is covered by the ornamental plate section 4a, and an outer appearance characteristic of the rear section of the main seat 2 is improved. In addition, the fixing member 4 is provided with the ornamental plate section 4a so as to enable the fixing member 4 to be changed into a large-sized member without deteriorating its outer appearance characteristic, and its supporting strength can therefore be improved. Further, if the ornamental plate section 4a is extended over an entire width of the main seat 2 as found in the preferred embodiment of the present invention and both ends are fixed to the main seat 2 with screws, the main seat 2 can be supported at both ends at its maximum width, and the stability of the main seat 2 is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat fixing structure for a motorcycle in which a rising section extending in a slanting rearward and upward direction is formed at a rear section of a seat having a seat cover material thereon, and a rear surface of the rising section is inclined in a rearward and upward direction, the seat fixing structure comprising:

a fixing member for supporting the seat at a frame of the motorcycle, the fixing member being integrally provided with an ornamental plate section for extending along an outer circumferential edge section of the rear surface of said rising section and exteriorly of the seat cover material;

a first attachment lug located at a first end of said fixing member; and a second attachment lug located at a second end of said fixing member, wherein said first attachment lug and said second attachment lug are bent upwardly from said fixing member.

2. The seat fixing structure for a motorcycle according to claim 1, wherein said ornamental plate section extends over an entire length of the outer circumferential edge section at the rear surface of said rising section and is fixed at least at its both ends to said seat.

3. The seat fixing structure according to claim 1, further comprising at least one mounting ear located between said first and second attachment lugs, said at least one mounting ear including an aperture therein for passage of a fastener therethrough for attaching said seat fixing structure to the frame of the motorcycle.

4. A bracket for attaching a seat to a frame of a vehicle, said bracket comprising:

a substantially flat member having a first end and a second end, and a convexly curved side edge extending between said first end and said second end;

a first attachment lug located at said first end;

a second attachment lug located at said second end; and a pair of mounting ears located between said first attachment lug and said second attachment lug, said mounting ears each including an aperture therein for passage of a fastener therethrough for attaching said bracket to the frame of the vehicle, wherein said first attachment lug and said second attachment lug are bent upwardly from said substantially flat member.

5. The bracket according to claim 4, wherein said convexly curved side edge substantially follows a contour of a rear portion of said seat.

6. The bracket according to claim 4, wherein said mounting ears are bent downwardly from said substantially flat member.

7. The bracket according to claim 4, wherein said mounting ears are bent downwardly from said substantially flat member.

8. The bracket according to claim 4, wherein said first attachment lug and said second attachment lug each include an aperture therein.

9. The bracket according to claim 4, further comprising a third attachment lug located between said mounting ears.

10. The bracket according to claim 9, wherein said first, second and third attachment lugs each include an aperture therein.

11. The bracket according to claim 4, wherein said first and second attachment lugs are located at outermost width portions of said bracket.

12. The bracket according to claim 4, wherein said convexly curved side edge is a substantially circular arc from said first end to said second end of said flat member.

13. A bracket for attaching a seat to a frame of a vehicle, said bracket comprising:

a substantially flat member having a first end and a second end, and a convexly curved side edge extending between said first end and said second end;

a first attachment member located at said first end;

a second attachment member located at said second end;

a pair of mounting members located between said first attachment member and said second attachment member; and a third attachment member located between said mounting members, wherein said first, second and third attachment members, and said mounting members each include an aperture therein, and wherein said first, second and third attachment members are bent upwardly from said substantially flat member, and said mounting members are bent downwardly from said substantially flat member.

14. The bracket according to claim 10, wherein said third attachment lug is bent upwardly from said substantially flat member, and said mounting ears are bent downwardly from said substantially flat member.

15. The bracket according to claim 13, wherein said mounting members each include an aperture therein for passage of a fastener therethrough for attaching said bracket to the frame of the vehicle.

16. A motorcycle comprising:

a frame;

a seat having a curved rear end portion; and a bracket for attaching said seat to said frame, said bracket having a first end and a second end, and a convexly curved side edge extending between said first end and said second end, said convexly curved side edge substantially following a contour of said curved rear end portion of said seat, wherein said bracket further includes:

a first attachment lug located at said first end;

a second attachment lug located at said second end; and a pair of mounting ears located between said first attachment lug and said second attachment lug, said mounting ears each including an aperture therein for passage of a fastener therethrough for attaching said bracket to the frame of the motorcycle, wherein said first attachment lug and said second attachment lug are bent upwardly from said bracket.

17. The motorcycle according to claim 16, wherein said mounting ears are bent downwardly from said bracket.

18. The motorcycle according to claim 16, wherein said mounting ears are bent downwardly from said bracket.

19. The motorcycle according to claim 16, wherein said first attachment lug and said second attachment lug each include an aperture therein.

20. The motorcycle according to claim 16, further comprising a third attachment lug located between said mounting ears.

21. The motorcycle according to claim 20, wherein said first, second and third attachment lugs each include an aperture therein.

22. The motorcycle according to claim 21, wherein said third attachment lug is bent upwardly from said bracket, and said mounting ears are bent downwardly from said bracket.

23. The motorcycle according to claim 16, wherein said first and second attachment lugs are located at outermost width portions of said bracket.

24. The motorcycle according to claim 16, wherein said convexly curved side edge is a substantially circular arc from said first end to said second end of said flat member.

* * * * *